July 5, 1927.
F. J. STOLPE
SHOCK ABSORBING MEANS
Filed Nov. 9, 1922
1,634,522
2 Sheets-Sheet 1
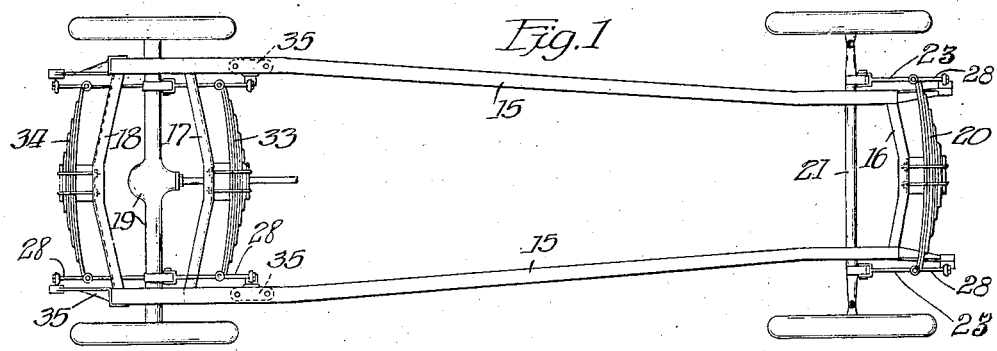
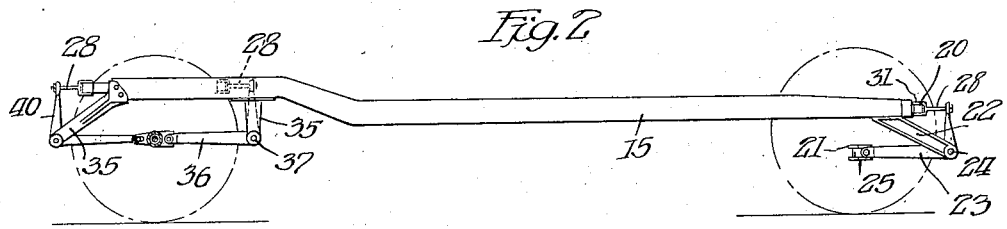
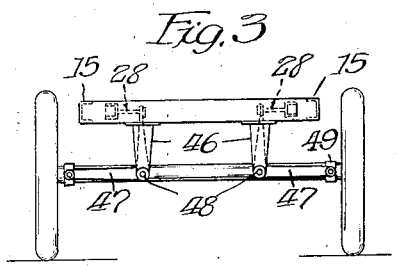
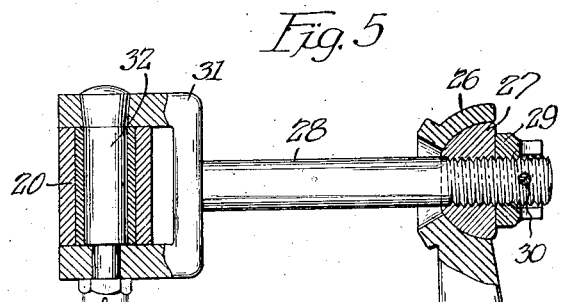
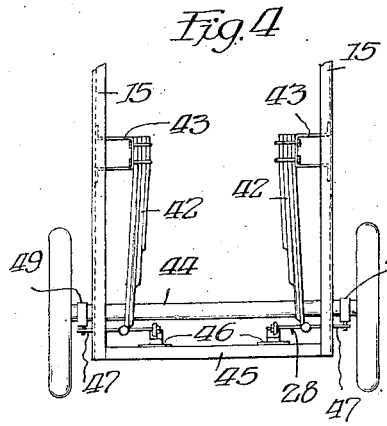
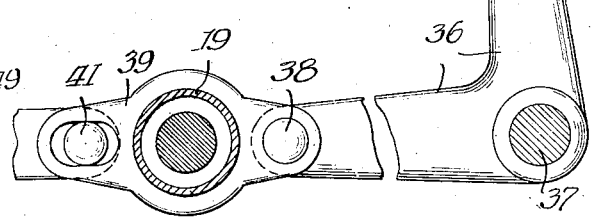
Inventor:
Frederick J. Stolpe
By George Heidman Atty.

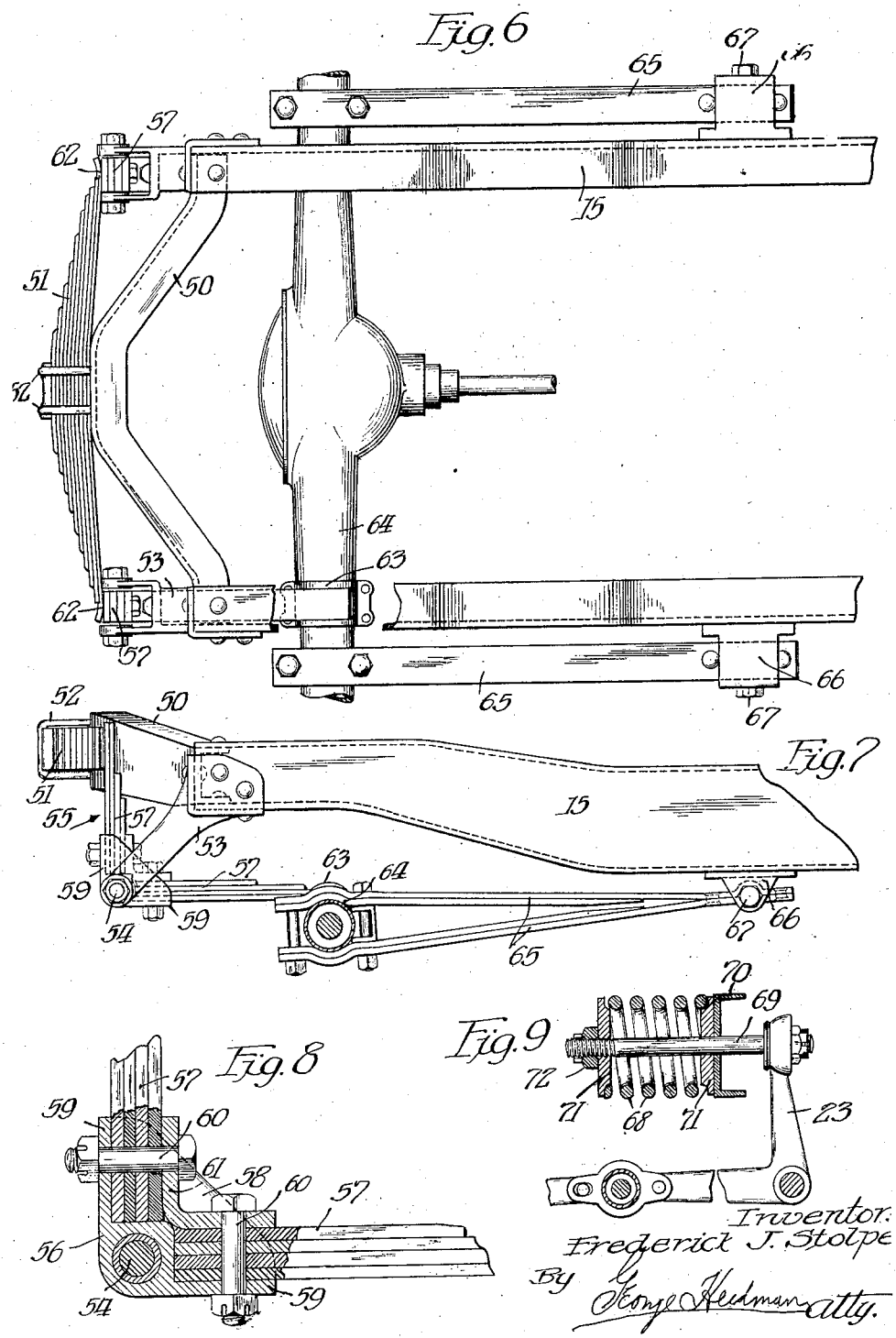

Patented July 5, 1927.

1,634,522

UNITED STATES PATENT OFFICE.

FREDERICK J. STOLPE, OF CHICAGO, ILLINOIS.

SHOCK-ABSORBING MEANS.

Application filed November 9, 1922. Serial No. 599,786.

My invention relates to shock absorbing or compensating means for vehicle suspension, more especially intended for use on automobiles, motor trucks and the like; the invention contemplating means whereby the strains and shocks encountered by the vehicle will be more readily absorbed.

One object of my invention is to provide means readily adaptable to the present type of motor driven vehicles, that is to say to the running gear and chassis without necessitating material changes or alterations in the construction thereof; the invention contemplating the use of suitable springs, arranged in a predetermined manner, in conjunction with yielding or pivoted elements whereby the shock absorbing elements or springs are shackled or secured to the running gear or axles of the vehicle.

The objects and advantages of my invention will be more readily comprehended from the detailed description of the accompanying drawings, wherein :—

Figure 1 is a plan view of a chassis and running gear provided with my improved means.

Figure 2 is a side elevation thereof.

Figure 3 is an end elevation of a modified form.

Figure 4 is a plan view of one end of the chassis and running gear illustrating the modified form shown in Figure 3.

Figure 5 is an enlarged detail view of the element for connecting the springs with the running gear.

Figure 6 is a plan view of one end of a chassis with portions of the running gear, illustrating a further modification of my invention.

Figure 7 is a side elevation of the construction shown in Figure 6.

Figure 8 is a detail sectional elevation of the coupling or connecting element employed in Figure 7.

Figure 9 is a detail view in sectional elevation of a modified form.

In the particular exemplification of the invention as disclosed in Figures 1 and 2, the chassis of the vehicle is illustrated as comprising the side frame members 15 secured together at the forward ends by means of the cross-bar or member 16, while the rear ends are shown secured together by means of cross members 17 and 18, arranged forwardly and rearwardly of the rear axle and differential housing generally indicated at 19.

Suitably secured to the forward cross member 16 by the well known method of U-bolts and bumper blocks, I provide the composite leaf spring 20 arranged horizontally and transversely of the chassis so that flexing of the spring or various leaves of the spring will be in a horizontal direction. In the particular exemplification, the spring 20 is located forward of the front axle indicated at 21 in Figure 2 and the side frames of the chassis are shown provided with the forwardly and downwardly presented brackets 22, and to the free end of each bracket is pivotally connected a bell-crank lever 23; that is to say each bracket 22 has the intermediate part of the bell-crank lever pivotally secured thereto as shown at 24. With the bell-crank levers pivoted as described and shown, one arm of each bell-crank lever is disposed upwardly and substantially into the same horizontal plane as that occupied by the ends of the spring 20; while the other arm of each bell-crank lever is disposed horizontally rearward and operatively connected with the front axle 21, as for example by means of a suitable bracket or link 25.

As is apparent from Figure 2, the pivotal points 24 of the bell-crank levers 23 are preferably arranged substantially in the same horizontal plane as the front axle; while the upstanding arm of each bell-crank lever is preferably provided with a socketed end or enlargement as more clearly shown at 26 in Figure 5 adapted to receive the semi-spherical member or nut 27 secured on the end of a connecting link or member 28. The semi-spherical member 27 is shown preferably held in place by suitable nuts as at 29 screwed on the threaded end of the connecting member 28 and a suitable pin 30 disposed through the nut and the end of the connecting member 28. If desired, of course, the members 27 and 29 may constitute an integral or single element. The other end of connecting member 28 is preferably bifurcated or in the nature of a yoke as at 31, see Figure 5, adapted to receive the adjacent end of the composite leaf springs 20; the yoke or bifurcated end 31 being adapted to receive a bolt or pin 32, which is preferably removably secured, whereby the curled end of the leaf spring 20 is coupled to the connecting member 28.

At the opposite or rear end of the chassis disclosed in Figures 1 and 2, I provide a pair of semi-elliptic leaf springs 33 and 34, connected at their intermediate portions to the cross members 17 and 18, respectively; the springs like spring 20 being arranged horizontally and transversely of the chassis so as to flex in a horizontal direction. The chassis frames 15, at suitable points, are each provided with a pair of brackets at 35, and depending beneath the frame members 15. The brackets disposed forward of the rear axle each have a bell-crank lever 36 pivotally connected thereto at the point 37, so that one arm of the bell-crank lever 36 will be disposed horizontally toward and substantially in alignment with the rear ax'e, while the other arm is disposed vertically upward into substantially the same plane as the free ends of the spring 33. The upwardly disposed ends of the bell-crank levers 36 are each provided with a connecting member or link 28 similar to that previously described and these connecting members or links 28 are secured to the adjacent end of the spring 33. The other or horizontally disposed end of each bell-crank lever 36 is pivotally connected at 38 to an axle housing encircling bracket or link 39. The rear spring 34 has each of its ends provided with a similar connecting member or link 28 having ball-and-socket connection with the upstanding arm of a bell-crank lever 40, while the forwardly and horizontally disposed end of the bell-crank lever 40 has slot and pin connection with the bracket or link member 39 as shown at 41 in Figure 5, thus permitting flexing of the springs and providing means adapted to the variation in the relative distances between the running gear and the underframe of the vehicle.

As is clearly apparent from the construction shown and described, the running gear and vehicle underframe are harnessed or coupled together by the respective springs and the coupling elements or bell-crank levers with the connecting links, and any shocks encountered either by the running gear or the chassis will be transmitted through the bell-crank lever connections and absorbed by the respective springs, which are adapted to flex in horizontal directions.

In Figures 3 and 4, I show a modified form of my invention, wherein the enlarged or butt ends of the leaf springs 42 are firmly secured by means of suitable brackets 43 to the inner, opposing surfaces of the side frames 15 of the chassis at a point somewhat removed from the axle shown at 44; the springs being disposed horizontally toward the end of the chassis and arranged to flex horizontally in directions transversely of the chassis of the vehicle. The cross member 45 of the underframe at the ends of the side frames 15 is provided with a pair of bracket members 46 having depending arms, to the lower ends of which the bell-crank levers 47 are pivotally secured as indicated at 48 in Figure 3, so as to have one end of each bell-crank lever 47 disposed upwardly into substantially the same horizontal plane as that of the ends of the springs 42, to which the bell-crank levers are linked by the connecting member 28; while the other or lower arm of each bell-crank lever 47 extends laterally and is pivotally connected with the axle or axle housing by means of a suitable link or bracket at 49. With the construction shown in Figures 3 and 4, it is apparent that when the running gear or chassis is subjected to shocks or jolts, the same will be absorbed by the lateral flexing of the springs and movement of the bell-crank levers; the bell-crank levers 47 oscillating about their pivotal points 48 and causing the springs 42 to flex horizontally in directions transversely of the chassis.

In both constructions described, the running gear and chassis are linked or operatively connected together by the springs and bell-cranks and the sudden upward movement of the running gear caused by an obstruction in the roadway will cause the horizontally disposed arm of the bell-crank levers 47 in Figures 3 and 4 to move vertically while the vertically disposed arms will be caused to move horizontally toward opposite sides of the chassis and thereby exert a pulling action on the respective leaf springs 42 and cause the shock to be absorbed.

In Figures 6 to 8, I show another modified form or application of the invention in conjunction with a radius element or member. In this instance, the ends of the side frames 15 of the chassis are shown provided with a cross-frame 50, preferably of the construction shown in Figure 6, with the intermediate or spring-attaching portion bent or bowed outwardly in a lateral direction beyond the immediate ends of the side frames in order to have the spring, indicated at 51, located slightly beyond the ends of the side frames 15; the spring 51 which is of the leaf spring type, being secured to the crossbar 50 in a suitable manner as for example by the U-bolts 52. The ends of the side frames 15 are each provided with a bracket or casting 53 disposed downwardly and outwardly as shown in Figure 7 and preferably bifurcated at its outer end, adapted to provide a pivotal point at 54 for the composite resilient bell-crank member indicated generally at 55. The composite bell-crank lever 55 in this instance is shown consisting of a suitable casting or block as at 56 which is preferably disposed between the bifurcations at the lower end of the bracket 53, as shown in Figure 6; the casting being apertured to receive pivot pin 54. The casting is formed to provide two shoulders against which the ends of a number of short leaf springs or plates 57 abut; these leaf springs constituting the bell-crank levers 55. As shown in Figure 8, the two sets of leaf springs are disposed at right angles to each other. In order to provide a more rigid construction, the casting or block 56 is preferably provided at opposite sides with connecting webs as at 58 formed integral with the extended sides 59 of the casting 56, thereby providing sockets for the ends of the spring members 57. The ends of the spring members 57 are secured in place by suitable bolts as at 60, 60, passing through the extensions or wings 59 of the casting or block 56, and at the opposite or inner side of the angle through an angular plate or member 61. With this construction the ends of the leaf springs or plates 57 are firmly clamped to the casting or block 56.

The composite or spring plate bell-crank elements in this construction are mounted so that one set of leaf members 57 is disposed upwardly and into free bearing relation with the ends of the leaf spring 51, as shown at 62 in Figure 6; while the ends of the horizontally disposed portions of the composite bell-cranks rest on the rear axle housing or on a suitable bracket 63 which may be suitably bolted to the housing 64 of the rear axle and therefore exert a downward pressure on the housing of the axle; it being understood that the bell-crank members 55 are normally arranged under slight tension relative to the spring 51 and the rear axle housing or bracket 63. The radius element on each side of the vehicle, as disclosed in Figures 6 and 7, are composed of a number of spring plates or bars 65 arranged either in multiple or singly, in vertical spaced relation; the rear ends of the spring plates being arranged above and below the rear axle housing and firmly secured thereto by bolts disposed through the separated plates both forward and rearward of the rear axle housing, thereby harnessing the rear axle to the chassis of the vehicle, as the forward ends of the separated spring plates or rods 65 converge and are brought into close relation and disposed through a clip or bracket 66 secured to the side of the side frames; the converging or juxtaposed ends of the radius spring plates 65 being suitably riveted or otherwise secured together about a pin 67 in each bracket 66. The spring members of the radius elements are arranged with their flat faces disposed horizontally so that the radius elements may flex or twist to compensate for torque of the rear axle housing induced by operation of the motor, with the result that a resilient connection or coupling between the chassis and the running gear is provided.

As is evident from the construction shown, any upward rebound or movement of the running gear will cause the composite bell-cranks 55 to move about their horizontal pivot points and cause the short plates 57 of the bell-cranks as well as the leaf spring 51 to flex; the spring 51 being made to flex in a horizontal direction or lengthwise of the underframe, so that the shocks or impulses will be absorbed through the flexure of the main spring 51 and the spring leaves or plates of the bell-cranks.

The ends of the leaf spring 51 are preferably slightly curved as shown at 62 in Figure 6 in order to have a frictional sliding relation with the upwardly disposed end of the adjacent plate or member of the composite bell-cranks; while the horizontally disposed members or plates of the composite bell-cranks have a similar sliding relation with the bracket member or clip 63 disposed about the axle housing 64; it being understood, of course, that in the assembly of the parts, the spring 51 and the short plates 57 of the bell-cranks 55 are normally arranged under slight flexure or tension thereby maintaining the respective elements in firm frictional relation with each other. It is also apparent that the spring plates or bars of the radius elements 65 will provide a yielding coupling between the chassis and the running gear, as these elements will practically absorb the impulses or torque encountered by the rear axle housing, due to operation of the motor.

The construction described and shown in Figures 1 to 8 will provide a shock absorbing relation between the running gear and the vehicle underframe; and while I believe these forms to be the best adaptations of the invention, it may have expression in somewhat different mechanical form without, however, departing from the spirit of my invention. As for example in Figure 9 I illustrate another form of the invention, namely in substituting coiled springs 68 for the leaf springs; the springs 68 being arranged to flex or compress in a substantially horizontal direction. With the form of spring shown in Figure 9, the bell-crank lever 23 may be identical with that employed with the construction shown in Figures 1 and 3 and illustrated in Figure 5, except that the connecting link or bolt 69, which has ball-and-socket connection with the upstanding arm of the bell-crank lever 23 as previously shown and described, is made to pass through a suitable opening in the cross member 70 of the chassis or vehicle underframe and extends through the coiled spring 68 arranged on the side of the cross member opposite to that on which the arm of the bell-crank lever 23 is located. In order to properly position the spring 68, I prefer to provide the link or bolt 69 with the discs or washers 71, 71 at opposite ends of the spring; while the outer end of the link or bolt 69 is provided with a nut 72 or other suitable means for maintaining the washers and spring in place. The horizontally disposed arm of the bell-crank lever is suitably connected with the axle of the running gear as previously described. As is apparent from the construction, an upward movement of the running gear will exert upward pull on the lower horizontally disposed arm of the bell-crank lever 23, causing the other arm to move in a direction away from the cross bar 70 of the underframe, thereby pulling on link 69 and compressing spring 68 which will absorb the jar. The spring 68, like the leaf spring, is preferably arranged to compress or flex in a substantially horizontal plane, instead of compressing or flexing vertically as has heretofore been the case.

What I claim is:—

1. Shock absorbing means comprising the combination of leaf springs secured adjacent to the ends of the chassis so as to flex in a horizontal direction, brackets rigidly secured to the chassis so as to depend beneath, and bell-crank levers pivotally connected at the intermediate point or angle to said brackets so as to oscillate vertically, the arms of said bell-crank levers being composed of juxtaposed resilient metallic plates, with one end of each bell-crank lever having frictional sliding relation with the adjacent end of the horizontally disposed leaf spring while the other end of each bell-crank lever has frictional sliding relation with the adjacent axle of the running gear, the leaf springs and the resilient plates of the bell-crank levers being normally arranged under slight flexure or tension.

2. In shock absorbing means, the combination of a radius member composed of resilient bars pivotally connected to the chassis at one end and having swiveled connection at the other end with the rear axle housing of the vehicle, with leaf springs secured to the chassis so as to flex horizontally, brackets rigidly secured to the chassis and depending therebeneath, and bell-crank levers pivotally connected at the intermediate point or angle to said brackets so as to oscillate vertically, one end of each bell-crank lever at the rear of the vehicle having frictional sliding relation with the rear axle housing while the other end of each of said bell-crank levers has yielding operative relation with the ends of the leaf springs.

3. In shock absorbing means, the combination of leaf springs secured to the chassis so as to flex horizontally, brackets rigidly secured to the chassis and depending therebeneath, and bell-crank levers comprising a socketed casting pivotally secured to the depending brackets, superposed resilient plates arranged in groups extending at right angles to each other, with one end of each group arranged in the socket of said casting and means whereby the superposed plates are removably secured to the casting, the superposed plates of one group being arranged in frictional sliding relation with the adjacent end of the leaf springs while the superposed plates of the other group are arranged in yielding bearing relation with the adjacent axle.

FREDERICK J. STOLPE.